Patented Sept. 20, 1949

2,482,389

UNITED STATES PATENT OFFICE 2,482,389

N-SUBSTITUTED AROMATIC SULFONAMIDE POLYMERS

Welcome I. Weaver, Huntingdon, Ind., and Lindsey M. Hobbs, Pittsburgh, Pa., assignors to Libbey-Owens-Ford Glass Company, Toledo, Ohio, a corporation of Ohio No Drawing. Application April 3, 1946, Serial No. 659,432

3 Claims. (Cl. 260—79.7)

The invention relates to the production of synthetic resins by polymerization, and particularly to a novel polymerization reaction and novel products resulting therefrom.

The principal object of the invention is the preparation of useful, new thermoplastic resins. More specific objects and advantages are apparent from the description, which merely discloses and illustrates the invention and is not intended to impose limitations upon the claims.

The present invention is based upon the discovery that a thermoplastic resin can be produced by polymerizing a composition comprising an N,N-trimethylene substituted aromatic sulfonamide selected from the class consisting of benzene, p-chlorobenzene, p-bromobenzene, toluene and o-naphthalene sulfonamides, in which the trimethylene radical contains not more than two substituents, selected from the class consisting of methyl and ethyl, which are connected to different carbon atoms.

The product of such polymerization ordinarily is a hard, transparent, colorless, thermoplastic resin.

A compound that is polymerized in the practice of the invention is an aromatic sulfonamide in which the nitrogen atom is one member of a four-membered ring. Each of these aromatic sulfonamides may be considered to be an N,N-trimethylene substituted aromatic sulfonamide, in which the trimethylene radical is unsubstituted or contains one methyl group, or two methyl groups connected to different carbon atoms, or one ethyl group, or two ethyl groups connected to different carbon atoms, or a methyl and an ethyl group connected to different carbon atoms. The two different carbon atoms to which such groups are connected may be the 1,2 or the 1,3 carbon atoms of the trimethylene radical. The sulfonamide may be a benzene, p-chlorobenzene, p-bromobenzene, o-toluene, m-toluene, p-toluene or o-naphthalene sulfonamide. One of the most readily available of these sulfonamides is the p-toluene sulfonamide in which the N,N-trimethylene radical is unsubstituted.

A polymer embodying the invention may be produced by polymerizing one or more of such sulfonamides, with or without any other polymerizable or unpolymerizable substance or substances.

Polymerization of the sulfonamide may be carried out in the presence of a catalyst such as sodium or potassium carbonate. The amount of catalyst used is simply that amount which causes the polymerization to take place at the desired rate, and usually is from about one per cent to about ten per cent of the weight of the sulfonamide.

The polymerization may be expedited by raising the temperature above room temperature, preferably to about 200–250° C. The temperature may be any temperature below the decomposition point of the material being polymerized.

Polymerization in accordance with the invention may be carried out in an open or closed mold to produce a casting. A fusible polymer embodying the invention may be shaped by compression or injection molding like other thermoplastic resins. In the production of cast or molded articles, plasticizers, lubricants, fillers, pigments and other coloring matter may be incorporated if desired.

Example

A substance to be polymerized in accordance with the invention may be prepared by reacting benzene, p-chlorobenzene, p-bromobenzene, o-toluene, m-toluene, p-toluene, or o-naphthalene sulfonamide with a dibromide such as 1,3-dibrom propane, 1,3-dibrom butane, 1,3-dibrom 2-methyl propane, 2,4-dibrom pentane, 1,3-dibrom pentane or 1,3-dibrom 2-methyl pentane. The reaction is carried out by refluxing an alcoholic solution of one-half mole of the sulfonamide, one-half mole of the dibromide and one mole of potassium or sodium hydroxide, containing just enough water to permit the hydroxide to dissolve, for several hours until the solution is substantially neutral. The solution is then evaporated under vacuum. After the residue has been extracted with water to remove the potassium bromide, the water-insoluble reaction product is recrystallized from absolute alcohol to give a yield of approximately 50 per cent. The reaction product polymerizes in the presence of about ten per cent of its weight of potassium carbonate in about three hours at 200–250° C. During that period the fused product becomes very viscous. Upon cooling it is a hard, clear resin.

Various embodiments of the invention may be devised to meet various requirements.

Having described the invention, we claim:

1. A polymeric N,N-trimethylene substituted aromatic sulfonamide selected from the class consisting of benzene, p-chlorobenzene, p-bromobenzene, toluene and o-naphthalene sulfonamides, in which the trimethylene radical contains not more than two substituents, selected from the class consisting of methyl and ethyl, which are connected to different carbon atoms, 2. A polymeric N,N-trimethylene substituted aliphatic sulfonamide as claimed in claim 1 in which the trimethylene radical contains no substituents.

3. Polymeric N,N-trimethylene p-toluene sulfonamide.

WELCOME I. WEAVER.
LINDSEY M. HOBBS.

REFERENCES CITED

The following references are of record in the file of this patent:

UNITED STATES PATENTS

| Number | Name | Date |
|---|---|---|
| 2,269,997 | Berchet | Jan. 13, 1942 |

FOREIGN PATENTS

| Number | Country | Date |
|---|---|---|
| 506,999 | Great Britain | June 5, 1939 |

OTHER REFERENCES

Karrer: Organic Chemistry, 2nd ed., pages 231–233, published by Elsevier, New York, 1946.